Jan. 21, 1941.   R. C. PRATT   2,229,221
VENETIAN BLIND
Filed Aug. 4, 1937   4 Sheets-Sheet 1
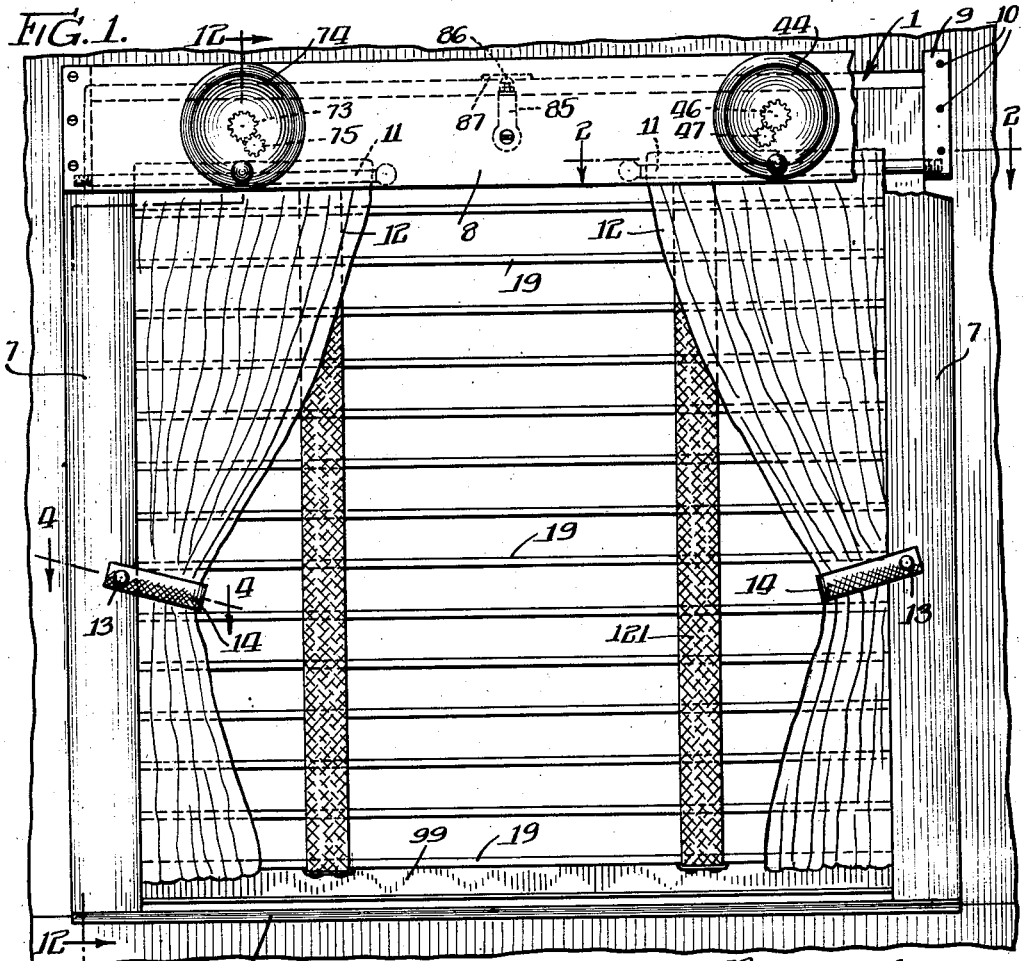
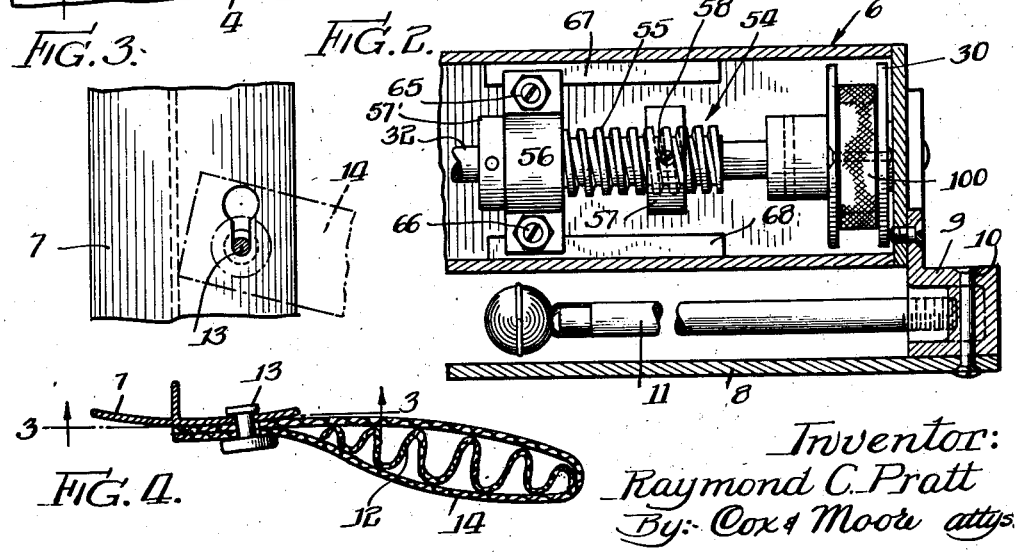
Inventor:
Raymond C. Pratt
By: Cox & Moore attys.

Jan. 21, 1941. R. C. PRATT 2,229,221
VENETIAN BLIND
Filed Aug. 4, 1937 4 Sheets-Sheet 2

Inventor:
Raymond C. Pratt
By:- Cox & Moore attys

Jan. 21, 1941.   R. C. PRATT   2,229,221
VENETIAN BLIND
Filed Aug. 4, 1937   4 Sheets-Sheet 3
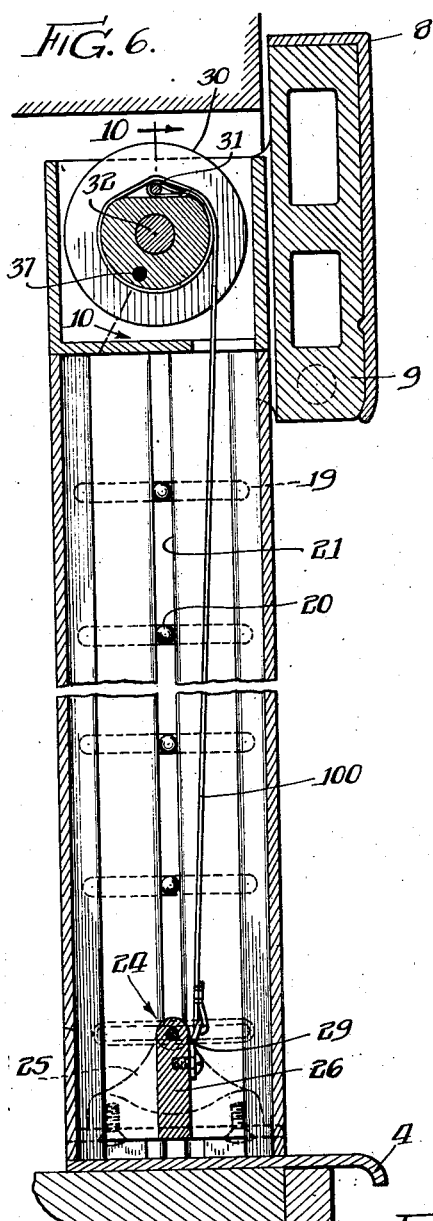
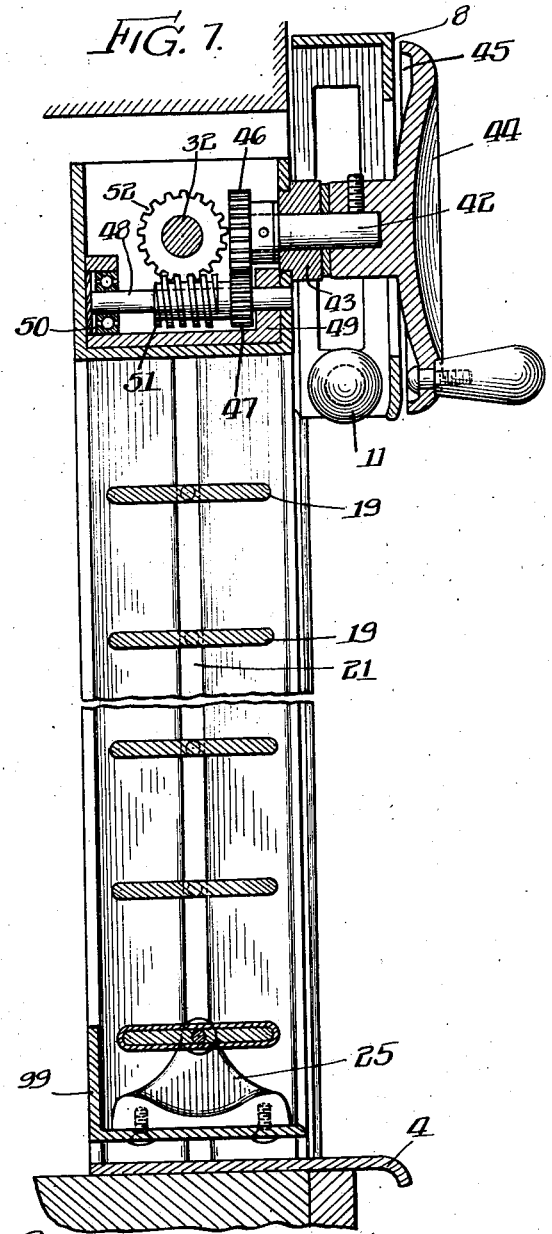
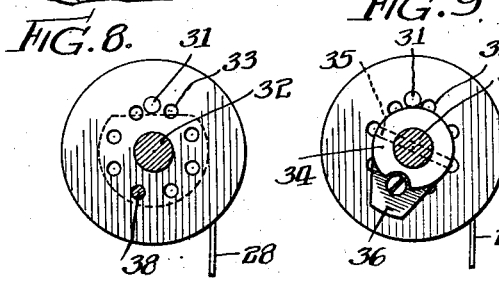
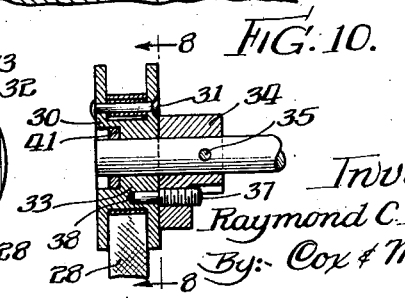
Inventor
Raymond C. Pratt
By: Cox & Moore
attys.

Jan. 21, 1941.  R. C. PRATT  2,229,221
VENETIAN BLIND
Filed Aug. 4, 1937  4 Sheets-Sheet 4
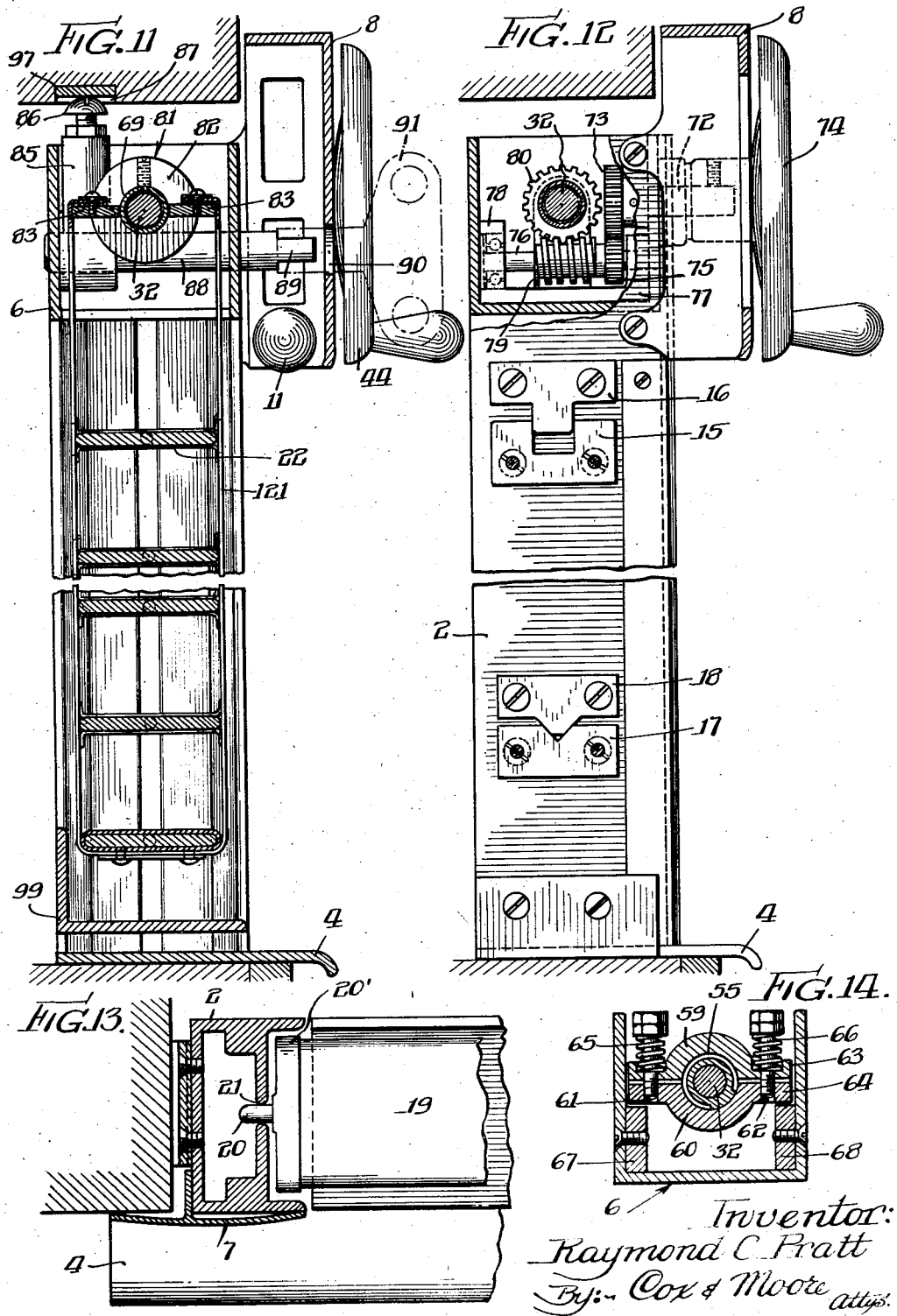
Inventor:
Raymond C. Pratt
By:- Cox & Moore attys.

Patented Jan. 21, 1941

2,229,221

UNITED STATES PATENT OFFICE 2,229,221

VENETIAN BLIND

Raymond C. Pratt, Chicago, Ill., assignor to H. B. Dodge and Company, Chicago, Ill., a corporation of Illinois Application August 4, 1937, Serial No. 157,260

8 Claims. (Cl. 156—17)

This invention relates to Venetian blinds, and particularly to Venetian blinds which are provided with a frame so that the entire blind and frame may be removably positioned in a window casing or like opening. A Venetian blind of this type is disclosed in applicant's co-pending application, Serial No. 29,774, filed July 5, 1935.

An object of the present invention is to provide a manually operated Venetian blind wherein the operating mechanism is substantially completely enclosed within the frame for the blind, and thus it is a further related object of the invention to eliminate the present unsightly operating mechanisms with which the present commercial Venetian blinds are provided.

It is a further object of applicant's invention to provide an efficient operating mechanism for the blind which shall be easy of manipulation, simple in construction and well adapted for the purpose intended.

It is a further object of applicant's invention to provide a Venetian blind readily adapted for ornamentation to the end that such a blind may enhance the beauty of the room, railway car, or other place where it may be used.

The accompanying drawings illustrate a selected embodiment of this invention and the views therein as as follows:

Fig. 1 is a front elevation of the improved Venetian blind and frame embodying the invention.

Fig. 2 is a horizontal section taken along the line 2—2 of Fig. 1.

Fig. 3 is a vertical section taken along the line 3—3 of Fig. 4.

Fig. 4 is a substantially horizontal section taken along the line 4—4 of Fig. 1.

Fig. 6 is a vertical end section taken along the line 6—6 of Fig. 5.

Fig. 7 is a vertical intermediate section taken along the line 7—7 of Fig. 5.

Fig. 8 is a detail vertical section taken along the line 8—8 of Fig. 10.

Fig. 9 is an end view of the adjustable pulley connection between the operating tapes and the operating shaft, and represents a side elevation of Fig. 10.

Fig. 10 is a detail vertical section on the line 10—10 of Fig. 6.

Fig. 11 is a detail intermediate section taken on the line 11—11 of Fig. 5.

Fig. 12 is a vertical section taken along the line 12—12 of Fig. 1.

Fig. 13 is a horizontal end cross section taken on the line 13—13 of Fig. 5.

Fig. 14 is a vertical cross section taken on the line 14—14 of Fig. 5.

Figure 5:
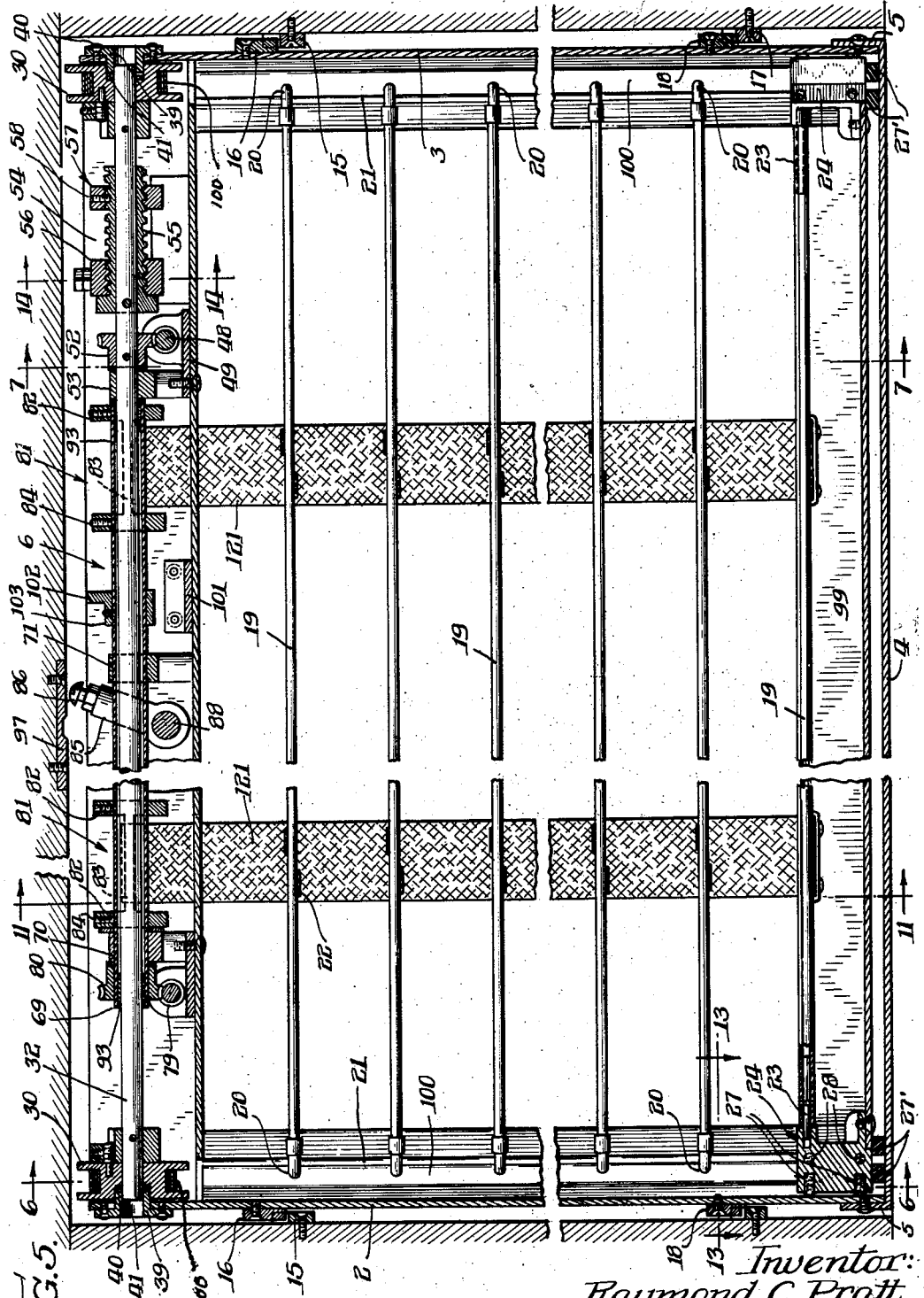
Fig. 5 is a vertical longitudinal cross section through the blind and frame.

Referring to the drawings, the numeral 1 designates a frame adapted to be removably inserted into a window casing or like opening. The frame 1 comprises opposed vertical frame members 2 and 3 forming channels for guiding the slats and for receiving the operating tapes, later to be described. The frame 1 also comprises a lower, bottom rail or stretcher 4 having upturned ends 5 secured to the outer face of the opposed vertical frame members, and an upper, horizontal box-like structure forming an upper frame member 6. Secured to the front faces of the opposed vertical frame members are decorative panels 7 and secured to the upper horizontal frame member, but spaced forwardly thereof, is a decorative strip or panel 8. These decorative strips 7 and 8 may be of any desired color, preferably contrasting with the color of the blinds, and may carry any desired artistic design for enhancing the beauty of the structure. As shown in Fig. 13, each decorative strip 7 has an intermediate rearwardly extending flange secured to the outer face of the associated frame member in any convenient manner. The front face of each decorative strip overlies the front face of the frame member and extends outwardly of the outer face of the frame member in position to overlie the adjacent edge of the window casing or like opening into which the blind is adapted to be inserted. The decorative strip 8 is attached in any convenient manner as by screws 10 to channels 9, Fig. 2, which are attached along their rearwardly extending flanges to the outer side face of the upper box-like frame member 6. The decorative strip 8 extends outwardly of the members 9 and vertically beyond the edges of said members to overlie the adjacent edges of the casing into which the blind and frame are adapted to be inserted.

Threaded into the channels 9 intermediate the decorative panel 8 and the front face of the upper frame 6, there are curtain or drapery supporting bars or rods 11. These rods 11 are adapted to receive at their upper ends, draperies or curtains 12 which may be detachably secured intermediate their length to the decorative strips 7. The manner in which these detachable connections are made is more clearly shown in Figs. 1, 3 and 4, wherein double-headed bolts 13, carried by the decorative strips 7, are received in keyhole slots in straps 14 which surround the curtains 12 intermediate their length.

The frame 1 is removably secured in the window casing or like opening by interengaging lugs 15, 16, 17 and 18, as best shown in Figs. 5 and 12. Lugs 15 and 17 are secured to the window casing or like opening at the opposite sides thereof, as shown in Fig. 5, and are adapted removably to engage the lugs 16 and 18, respectively, attached to the outer side faces of the frame 1.

The frame 1 carries a locking member 85, as best shown in Figs. 1 and 11, which carries an adjustable screw 86 for engagement in a recess 87 formed in the upper jamb of the window casing or like opening, to thereby lock the frame in said casing. The locking member 85 is secured to a rod 88 journaled in the front and rear vertical members of the frame 6. The rod 88 terminates intermediate the front face of the frame 6 and the decorative strip 8, and at its end carries a key-receiving projection 89. An aperture 90 formed in the decorative strip 8 is adapted to receive the shank of a key 91 for operating the rod 88 to lock or unlock the frame 1 to the window casing. The recess 87 in the window casing carries a metallic plate 97 for receiving the screw 86 and for preventing chipping of the casing by the said screw.

The slats 19, forming the Venetian blind, are mounted between the opposed vertical frame members and have portions 20 projecting into vertical guide slots 21 formed in the opposed vertical frame members. The projecting ends 20 may be made of sound deadening material, such as rubber, secured to the slats, or they may comprise caps of rubber or like material placed over integral lugs projecting from the side edges of the slats. As best shown in Fig. 13, the slats 19 extend within the inwardly projecting flanges of the vertical frame members and carry on their edges strips 20' of sound deadening material, such as rubber or the like. The members 20, 20' may be of the type disclosed and claimed in applicant's Patent No. 2,174,249 granted September 26, 1939, and assigned to the present assignee.

The slats are held in spaced-apart relationship by the usual spaced-apart vertical tapes 121, to which are secured the usual upper and lower slat-supporting strips 22. The tapes 121 extend on both sides of the slats and are secured to the bottom slat 19 in any usual manner.

Pivotally secured to the bottom slat 19, as by pins 23, are the guide members 24. Each of these guide members 24 has a portion 25 generally V-shaped in outline, as best shown in Fig. 7, and a portion 26 of rectangular cross section, as best shown in Fig. 6. The portion 26 extends through the guide slot in the vertical frame member and carries inserts 27 of rubber or like material, which project therefrom and engage the sides of the channel, formed within each vertical frame member, for preventing side sway of the blind. Inserts 28 of rubber or like material engage the sides of the slots in the vertical frame members to prevent rattling of the guide members and to-and-fro movement of the blind. Secured to the portions 25 of the guide members 24 is a generally L-shaped bottom bar 99, the weight of which insures the proper spacing of the slats and prevents canting of the slats relative to each other. The bottom bar 99 also facilitates complete closure of the opening in the frame without interference with the tilting movement of the bottom slat. Oppositely disposed rubber stops 27' engage the bottom bar 99 and the guide members 24 to prevent engagement of the bottom bar 99 with the lower stretcher 4 to prevent marring of the latter by the sudden engagement of these members.

The operating and tilting mechanism for the slats will now be described. Lifting tapes 100, which extend through the channels formed in the opposed vertical frame members 2 and 3, are pivotally secured to the guide members 24 by clips 29 fastened thereto in any convenient manner, as best shown in Fig. 6. The upper ends of the lifting tapes are secured to pulleys 30 by bolts 31 which pass through the side flanges of the pulleys and through loops formed in the ends of the tapes. The pulleys 30, as best shown in Figs. 8, 9 and 10, are adjustably connected to opposite ends of a shaft 32 which extends through the upper box-like frame member 6. Each pulley 30 is rotatably mounted upon the shaft 32 and has in one of its flanges a number of apertures 33 equidistantly spaced from the axis of the shaft 32. An adjustment member 34 is fixedly secured to the shaft 32, as by a pin 35, and has a laterally extending portion 36 which carries a screw 37. The screw 37 is threaded into the portion 36 of the member 34 and has a projecting portion 38 of reduced diameter adapted to engage in any one of the apertures 33. It will be apparent that this connection between each pulley and the shaft 32 permits the adjustment of each pulley relative to said shaft, thereby properly to determine the required length of the tapes 100 and to insure the proper horizontal positioning of the slats of the blind.

The shaft 32 is rotatably mounted in end brackets 39 fastened to the upwardly extending side edges of the vertical frame members 2 and 3 and these brackets 39 have journal portions 40 extending into apertures formed in the outer faces of the pulleys for providing bearing surfaces for said pulleys. Washers 41 or the like are interposed between the portions 40 of the brackets 39 and the pulleys 30 to provide thrust bearings for said pulleys.

The shaft 32 is operated in the following manner. A shaft 42, rotatably mounted in a journal bracket 43 fastened to the front face of the upper box-like frame member 6, carries at its outer end an operating hand wheel or disk 44 secured thereto for rotation therewith. The hub of the hand wheel or disk 44 passes through an aperture 45 in the front face of the decorative strip or panel 8. Fixedly secured to the inner end of the shaft 42 is a gear 46 which meshes with a gear 47 secured to a stub shaft 48 which extends transversely of the frame member 6. The stub shaft 48 is journaled at one end in a bracket 49 fastened to the frame member 6. The other end of the stub shaft 48 is supported in a roller bearing 50 carried by the bracket 49. The stub shaft 48 carries a worm 51 which meshes with a worm wheel 52 fixedly secured to the shaft 32. A supporting bearing 53 for the shaft 32 is also carried by the bracket 49.

It is apparent that upon rotation of the hand wheel 44, the gears 46 and 47 will cause rotation of the stub shaft 50, and, through the gears 51 and 52, rotate the shaft 32 to wind or unwind the tapes 100 from the pulleys 30 and thereby cause the raising and lowering of the slats of the blind.

In order to limit the rotation of the shaft 32 and thereby protect the blind and operating mechanism against overadjustment, which would cause a breakage of the operating parts, a limit control unit, designated generally by the reference numeral 54, is provided. As shown in Figs. 2, 5 and 14, this limit control unit comprises a centrally bored screw 55 fixedly secured to the shaft 32 for rotation therewith. This screw 55 carries a reciprocating nut 56 and a plurality of stop members 57 and 57'. The stop member 57 is adjustably secured to the screw 55 by set screw 58 and the stop member 57' is formed integrally with the screw 55, as shown in Figs. 2 and 5. The reciprocating nut 56 comprises split sleeves 59 and 60, which are internally threaded to receive the screw 55. Pins 61 and 62 are slidably received in apertures formed in outwardly extending flanges 63 of the sleeve 59 and threadedly engage in apertures formed in the outwardly extending flanges 64 of the sleeve 60. Surrounding these pins are springs 65 and 66 which yieldingly urge the upper sleeve 59 into tight engagement with the threads of the screw 55. The reciprocating nut is guided in its movement longitudinally of the screw 55 by guide plates 67 and 68 which underlie the sleeve 60 of the reciprocating nut and are fastened to the opposed upright portions of the box-like frame member 6. The movement of the reciprocating nut 56 is determined by the position of the stop member 57. When the reciprocating nut 56 engages the stop member 57 the latter prevents further longitudinal movement of the nut 56 and this prevents further rotation of the screw 55 and shaft 32 attached thereto.

The purpose of the use of the split nut 56, maintained in operative relationship by the springs 65 and 66, is to prevent freezing or jamming of the nut 56 against the stop members 57 and 57'. It has been heretofore a very serious difficulty with limit nuts of this general structure that when the nut is forcefully brought up against the stop member it will jam or freeze thereagainst, in some instances rendering it necessary to dismantle the entire structure in order to separate and repair the parts. The present structure provides a unique solution to this problem. Thus, even though the reciprocating nut 56 is brought up against either of the stop members 57 or 57' with extreme force, nevertheless the springs 65 and 67 will permit the split halves of the nut to separate resiliently in conjunction with the pitch or taper of the thread. As a result, the device may be readily actuated in the opposite direction without any appreciable binding or freezing of the contacting parts.

For tilting the slats to open and close the blind the following mechanism is provided. A sleeve 69 surrounds a portion of the shaft 32 and is journaled in bearings 70 and 71 (Fig. 5). An operating shaft 72 (Fig. 12), projecting beyond the upper frame member 6, carries at its inner end a gear 73 and at its outer end a hand wheel 74. The gear 73 meshes with the gear 75 carried by a stub shaft 76 journaled on a bracket 77 mounted within the frame member 6 and in a roller bearing 78 carried by said bracket. The stub shaft 76 carries a worm gear 79 meshing with a worm wheel 80 fastened to the sleeve 69. The rotation of the hand wheel 74, through gears 73, 75, 79 and 80, causes rotation of the sleeve 69 relative to the shaft 32.

The tilting tapes 121 are secured to brackets 81 carried by the sleeve 69. The brackets 81 comprise centrally bored disk end pieces 82 and arms 83 extending longitudinally of the sleeve 69 between said end pieces. The brackets 81 are secured to the sleeve 69 in any convenient manner as by screws 84 passing through the end pieces and engaging the sleeve 69. As shown in Fig. 11, oscillation of the sleeve 69 causes oscillation of the arms 83 and of the slats 19 connected by tapes 121 to said arms.

For limiting the oscillatory movement of the sleeve 69, a plate 101 fixed to the bottom of the box-like frame member 6 engages a finger 102 which projects radially from a collar 103 adjustably secured to the sleeve 69.

In the present embodiment shown herein, the slats are made of metal, or at least covered with metal, and the tilting tapes are shown as being made of fabric. However, in actual practice slats and tilting tapes of other materials may obviously be employed with success and advantage.

It will be evident that the Venetian blind herein disclosed provides a compact, unitary structure adapted to be removably positioned within a window casing or like opening, and wherein the operating mechanism therefor is substantially enclosed within the frame of the completely blind to thus enhance the operating efficiency and beauty of the blind.

It will also be evident that applicant's structure provides a Venetian blind adapted to receive curtains or other decorative draperies for the enhancement of the appearance of the blind.

Changes may be made in the form, construction and arrangement of the parts without departing from the spirit of the invention or sacrificing any of its attendant advantages, and the right is hereby reserved to make all such changes as fall within the scope of the following claims.

The invention is hereby claimed as follows:

1. In a Venetian blind, the combination of a plurality of superposed slats, a shaft rotatably mounted above said slats, means for rotating said shaft, means connecting said shaft to said slats for raising and lowering the same in response to the operation of said shaft, and translating means operated by the rotation of the shaft for limiting the rotative movement of said shaft.

2. In the combination of claim 1 wherein the means for limiting the rotative movement of said shaft comprises a screw member fastened to said shaft for rotation therewith, a reciprocating nut threadedly engaging said screw member and an adjustable stop member secured to said screw member in a predetermined position to limit the movement of said reciprocating nut.

3. In the combination of claim 1 wherein the means for limiting rotative movement of said shaft comprises a screw member mounted upon said shaft for rotation therewith, a reciprocating nut threaded upon said screw for movement longitudinally of said screw, means for guiding said reciprocating nut and a plurality of stop members adapted to engage said reciprocating nut to limit the longitudinal movements thereof.

4. In a Venetian blind, the combination of a plurality of superposed slats, a shaft rotatably mounted above said slats, pulleys loosely mounted on opposite ends of said shaft, tapes connecting said pulleys to opposite ends of one of said slats and means for adjustably securing each of said pulleys to said shaft whereby said pulleys may be individually adjusted on said shaft to maintain the slats in horizontal position.

5. In a Venetian blind, the combination of a frame having opposed vertical channel members and an upper horizontal channel member, a plurality of superposed slats mounted within said frame, a shaft rotatably mounted in said horizontal channel member, a plurality of pulleys loosely mounted on opposite ends of said shaft above said vertical channel members, a plurality of tapes passing through said vertical channels for connecting said pulleys to the bottom one of said slats and means for adjustably securing each pulley to said shaft whereby said pulleys may be individually adjusted on said shaft to maintain the slats in horizontal position.

6. In a Venetian blind, the combination of a frame for said blind, a plurality of superposed slats mounted within said frame for tilting movement relative to said frame, a bar pivotally connected to the bottom one of said slats and extending therebelow for forming with said slats a substantially complete enclosure for said frame while permitting tilting movement of the bottom slat relative to said frame.

7. In a Venetian blind, the combination of a frame comprising opposed vertical channel members, a plurality of superposed slats mounted within said frame and having extensions engaging in said channel members for guiding the slats, means connected to said slats for tilting the same to open and close said blind, means for raising and lowering said slats, a bar extending vertically below the bottom one of said slats for forming with said slat a substantially complete enclosure for said frame while permitting tilting movement of the bottom slat relative to said frame, and means pivotally connected to said bottom slat, fixedly secured to said bar and engaging in said vertical channels for guiding said bottom slat and bar during raising and lowering of the blind.

8. In a travel limit device for a Venetian blind or the like, a control screw, stop members on said screw and fixedly positioned with respect thereto, a nut mounted for reciprocation longitudinally of the control screw and toward and away from said stop member for limiting the extent of rotation of the screw, said nut being longitudinally split to provide portions oppositely engaging the screw, and resilient means normally urging the split portions into opposite engagement with the screw whereby to eliminate freezing or jamming of the nut when in contact with the stop member.

RAYMOND C. PRATT.